United States Patent [19]

Grossenbacher, Jr. et al.

[11] Patent Number: 5,138,903
[45] Date of Patent: Aug. 18, 1992

[54] TEMPERATURE COMPENSATING TRANSMISSION MOUNT

[75] Inventors: Ernest Grossenbacher, Jr.; Thomas A. Kowalczyk, both of Pittsfield; Douglas F. Davis, West Stockbridge, all of Mass.

[73] Assignee: General Electric Company, Pittsfield, Mass.

[21] Appl. No.: 629,327

[22] Filed: Dec. 17, 1990

[51] Int. Cl.⁵ .............................................. F16H 57/02
[52] U.S. Cl. .................................. 74/606 R; 403/373; 248/901; 24/279
[58] Field of Search ..................... 74/606 R; 403/373; 248/550, 65, 74.1, 62, 901; 24/279

[56] References Cited

U.S. PATENT DOCUMENTS

| | | | |
|---|---|---|---|
| 3,564,676 | 2/1971 | Oeser | 24/279 |
| 3,829,234 | 8/1974 | Benz | 248/901 X |
| 3,937,433 | 2/1976 | Portaleoni | 248/19 |
| 4,442,733 | 4/1984 | Hartz | 74/606 |
| 4,601,449 | 7/1986 | Sharbaugh | 248/901 X |
| 4,611,839 | 9/1986 | Rung et al. | 24/279 X |
| 4,618,111 | 10/1986 | Sherwood et al. | 248/901 X |
| 4,657,284 | 4/1987 | Fiori | 24/279 X |
| 4,688,909 | 8/1987 | Smith | 350/631 |
| 4,714,229 | 12/1987 | Force et al. | 24/279 X |
| 4,750,841 | 6/1988 | Hicks | 366/79 |
| 4,890,812 | 1/1990 | Chechile et al. | 248/674 |
| 4,930,367 | 6/1990 | Nagasawa | 74/606 R X |

FOREIGN PATENT DOCUMENTS

| | | | |
|---|---|---|---|
| 3245703 | 6/1984 | Fed. Rep. of Germany | 24/279 |
| 3817320 | 11/1989 | Fed. Rep. of Germany | 74/606 R |
| 678244 | 8/1979 | U.S.S.R. | 248/901 |
| 794571 | 5/1958 | United Kingdom | 248/901 |

*Primary Examiner*—Vinh T. Luong
*Attorney, Agent, or Firm*—Robert A. Cahill

[57] ABSTRACT

To accommodate differential thermal growth of a component and its support, a pair of temperature responsive mounts are provided. Each mount comprises a rigid, bowed beam having lugs at each end affixed to the component and an intermediate lug affixed to the case. Thermal expansions of the beams and the component load the beams in compression, causing flexures thereof in directions to produce motions of the third lugs that track the thermal growth of the support.

13 Claims, 2 Drawing Sheets

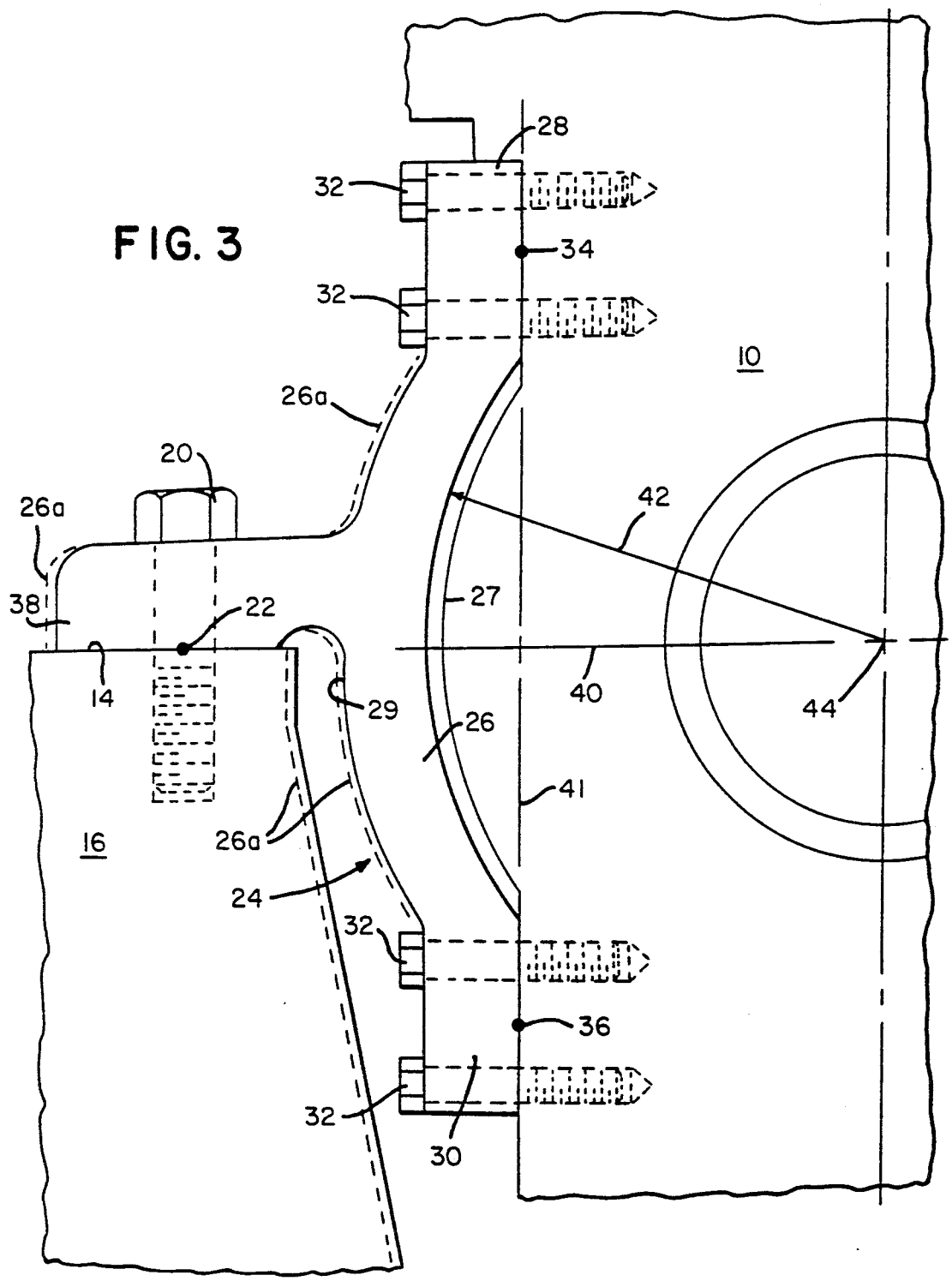

TEMPERATURE COMPENSATING TRANSMISSION MOUNT

The present invention relates to temperature compensating structures for maintaining the requisite mounted positions of components despite changes in temperature and to minimize stresses at the points of mounting attachment due to differential thermal coefficients of expansion.

BACKGROUND OF THE INVENTION

The mounting of components to support structures in operating environments of wide variations in temperature requires prudent engineering design when materials of different thermal coefficients of expansion are involved. Differential thermal growths of the component and the support structure can create significant mechanical stresses at their points of attachment and ultimate fatigue failure when the parts undergo frequent thermal cycling. Another important design consideration in many applications is maintaining the mounted component in a fixed position relative to the support structure despite wide variations in temperature.

An application where both fatigue failure and positioning considerations are of critical importance is the mounting of transmission operating components to the transmission case. Transmissions, such as hydromechanical steering transmissions in military vehicles, e.g., tanks, are subjected to temperatures cycling over a wide range. From cold starts in sub-zero temperatures, a tank transmission can heat up to several hundred degrees Fahrenheit in service. The transmission operating components are typically made of steel, while the mounting case is typically aluminum to save weight. The different coefficients of expansion of steel and aluminum result in different thermal growths at the common points of mounting attachment between the component and case. With repeated thermal cycling, the stresses generated at these attachment points can ultimately lead to fatigue failure of one of the parts, most typically the aluminum case. Moreover, this different thermal growth can alter the crucial alignment between transmission operating components, causing undo bearing and gear wear and other adverse consequences.

SUMMARY OF THE INVENTION

It is accordingly an object of the present invention to provide a temperature compensating mount for mounting a component to a support.

A further object is to provide a temperature compensating mount of the above-character which accommodates differential thermal growth of the component and support.

Another object is to provide a temperature compensating mount of the above-character, wherein mechanical stresses at the attachment points between the mount and the support are substantially eliminated under thermal cycling conditions.

An additional object is to provide a temperature compensating mount of the above-character, wherein the position of the component relative to the support is maintained with wide variations in temperature.

Other objects of the invention will in part be obvious and in part appear hereinafter.

In accordance with the present invention, there is provided a mount interposed between and attached to a component and a support of different thermal coefficients of expansion for mounting the component to the support. The mount, implemented as a pair of mounts, accommodates differential thermal growth of the component and support such as to eliminate mechanical stresses at the points of attachment between the mount and the support and to preserve the relative positions of the component and support with variations in temperature.

To this end, each mount includes a bowed or curved support beam terminated at each end in outer mounting lugs which are affixed to the component at spaced attachment points. At a central location between the outer lugs, a lug extends laterally outward from the support beam and is affixed to the support at an intermediate attachment point. The mounts of the pair are situated in generally flanking relation to the component.

The geometry of each mount and the relationship of the mount thermal coefficient of expansion to that of the component and the support are selected to be such that, under varying temperature conditions, differential expansion (or contraction) of the component and the mounts produces a loading of the support beams, resulting in flexures thereof. Beam flexing causes the movement of the attachment point at the central lug to track the movements of the attachment points at the support for each mount, with the result that mechanical stresses at these attachment points are virtually eliminated. Coincidentally, the positional relationship of the component and the support is preserved.

The invention accordingly comprises the features of construction, combination of elements, and arrangement of parts, all of which as described hereinafter, and the scope of the invention will be indicated in the appended claims.

BRIEF DESCRIPTION OF THE DRAWINGS

For a full understanding of the nature and objects of the present invention, reference may be had to the following Detailed Description taken in connection with the accompanying drawings, in which:

FIG. 3 is an enlarged end view of one of the temperature compensating mounts of FIG. 2.

Corresponding reference numerals refer to like parts throughout the several views of the drawings.

DETAILED DESCRIPTION

Figure 1:
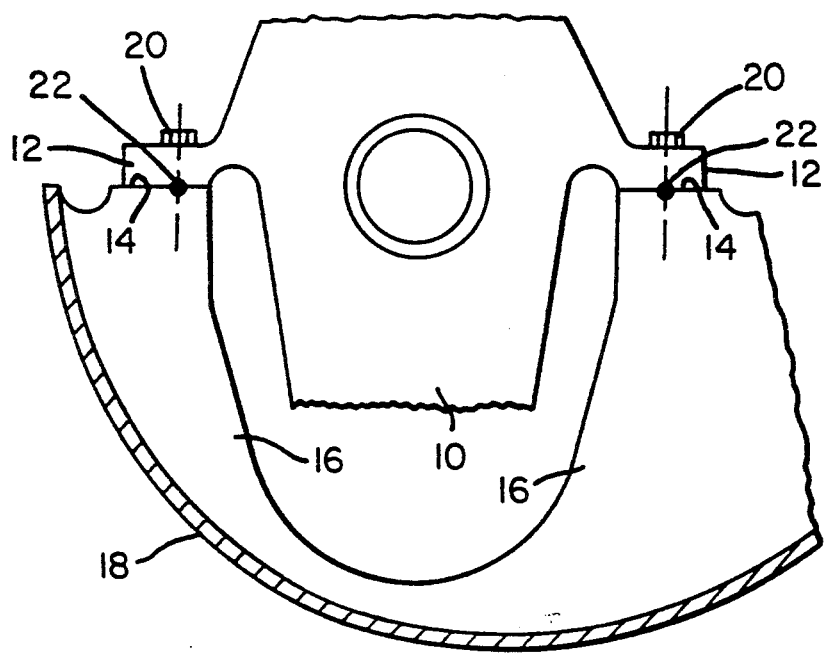
FIG. 1 is an end view, partially broken away, of a prior art approach to mounting a transmission component to a transmission case.

The assembly of operating components of a transmission has typically called for mounting the components directly to the transmission case. Thus, as seen in FIG. 1, the prior art approach has been to provide an operating component 10, such as a hydrostatic drive unit of a hydromechanical steering transmission, with opposed laterally extending ears or lugs 12 which rest on platform mounting surfaces 14 of ribs 16 integrally formed with a transmission case 18. The assembly is secured using bolts 20. Unfortunately, component 10 and case 18 are typically formed of dissimilar metals having different thermal coefficients of expansion. To save weight, the transmission case is aluminum, while the operating component is typically steel. Aluminum has a greater thermal coefficient of expansion than steel. Consequently, under the widely varying temperature conditions encountered in service, the common attachment points 22 of the component and case attempt to move at different rates as these parts thermally grow and shrink. Relative movements of the component and case attachments points are obviously constrained by bolts 20, and thus stresses are generated at these attachments. With repeated thermal cycling, shearing forces parallel to platform surfaces 14 develop cracks in ribs 16 surrounding the tapped bolt holes, leading to ultimate fatigue failure of the weaker aluminum case material.

Figure 2:
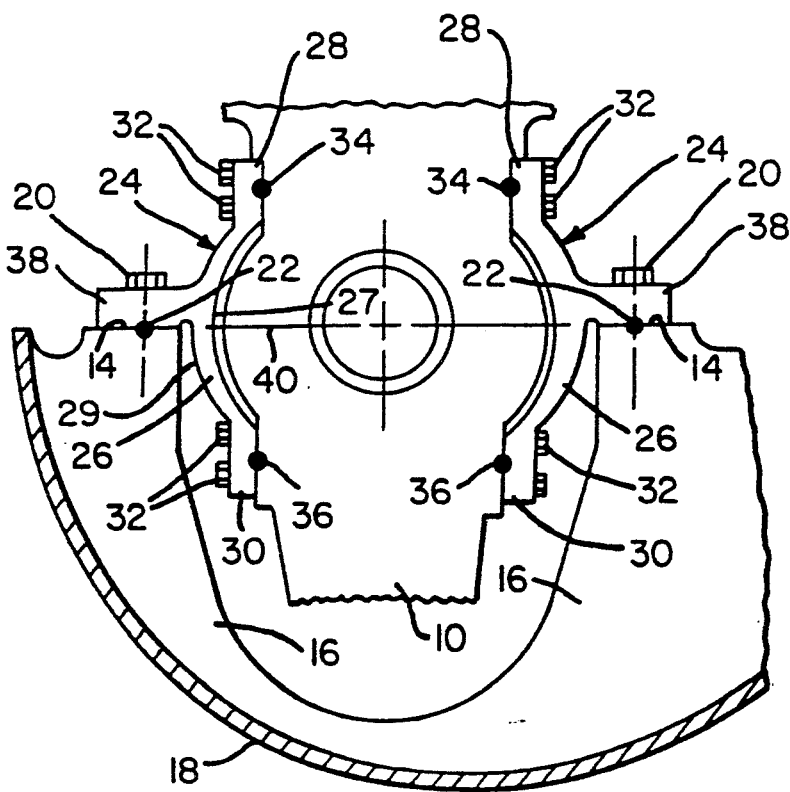
FIG. 2 is an end view, partially broken away, of temperature compensating mounts constructed in accordance with the present invention for mounting a transmission component to a transmission case.

In accordance with the present invention and as seen in FIG. 2, operating component 10 is mounted to transmission case 18 via a pair of intermediary, temperature compensating mounts, generally indicated at 24. The component is reconfigured to remove lugs 12 seen in FIG. 1 to accommodate mounts 24 in flanking relation. Each mount includes an outwardly curved or bowed (relative to component) support beam 26 terminating at its ends in upper and lower lugs 28 and 30, respectively. These lugs are affixed to component 10 by bolts 32, to establish pairs of upper 34 and lower 36 attachment points. At a central location between lugs 28 and 30, an ear or lug 38 extends laterally outward from the convex side 29 of of each support beam 26. The concave sides 27 of the support beams face component 10. These lugs 38 rest on platform mounting surfaces 14 and are clamped to ribs 16 via bolts 20 to establish common attachment points 22. The mounts are formed of a metal having a higher thermal coefficient of expansion than steel component 10.

To describe the temperature compensating action of mounts 24, reference is made to the enlarged view of one of the mounts see in FIG. 3. When the transmission is non-operating and the component and case are at the ambient temperature of the environment, the only stresses on the attachment points 22, 34 and 36 are those imposed by the component weight. The loading on ribs 16 are compression forces normal to platform surfaces 14, which the aluminum case can readily withstand. As the component, case and mount heat up during transmission operating, support beam 26 grows at a faster rate than the transmission component. As a consequence, component 10 loads the support beam in compression, causing it to flex outwardly, as indicated by dash lines 26a. This action produces outwardly motion of attachment point 22 of lug 38. The attachment point 22 of case rib 16 also moves outwardly as case 18 experiences thermal growth. By structuring mounts 24 with appropriate dimensions and geometry and of a material having the proper thermal coefficient of expansion relationship with the component and case materials, the attachment points 22 of the lugs 38 and case ribs 16 are caused to move at the same rate, i.e., track each other, during thermal cycling of these parts. Absent forces attempting to produce relative movement between the mounts lugs and the case ribs at platform surfaces 14, lateral shearing stresses at the common attachment points 22 are effectively eliminated. Fatigue failure of the transmission case due to temperature variations is thus avoided. By virtue of the designed curvature of support beams 26, the direction and degree of flexure are predetermined and controllable. It will be appreciated that flexure of the beams is effective in avoiding excessive shearing stresses at attachment points 34 and 36 between the component and the mounts.

Since the actions of the mounts are duplicated at each side of the component, the positional relationship between the component and the case is not disturbed during thermal cycling. Duplication of mount reaction to temperature variations is assured in the illustrated embodiment in FIGS. 2 and 3, wherein attachment points 22 are aligned with horizontal centerline 40 of component 10, and wherein attachment points 34 and 36 are vertically aligned, as indicated by line 41, and are located equidistance above and below centerline 40. Also, when the mounts are installed, the radius of curvature 42 of beams 26 is centered on the axis 44 of component 10. Since other transmission operating components are also mounted by case 18, their alignments with component 10 are also preserved.

It will be appreciated that beams 26 are of a sufficient cross section to constitute rigid support members, and thus the mounting of the component to the case is rigid in character at all temperatures. Thus, flexure of the beams occurs only in response to variations in temperature and not in response to vibration or mechanical shock incident with transmission operation. It should be understood that attachment points 22, 34 and 36 are used herein as a matter of convenience in describing the reactions of the parts of variations in temperature. These attachment points correspond to points located at the geometrical centers of the areas of interfacial contact between the lugs and the component and case.

While the temperature compensating mount of the present invention has been disclosed in its application to mounting transmission components, it will be appreciated that the teachings herein are applicable to mounting any object to a support, wherein differential thermal growth of the object and support with variations in temperature jeopardizes support integrity and alignment.

It is seen from the foregoing that the objects set forth above, including those made apparent from the preceding Detailed Description, are efficiently attained, and, since certain changes may be made in the construction set forth without departing from the scope of the invention it is intended that matters of detail be taken as illustrative and not in a limiting sense.

Having described the invention, what is claimed as new and desired to secure by Letters Patent is:

1. A temperature compensating mount for rigidly mounting a component to a support, wherein the component and the support have different thermal coefficients of expansion, said mount (24) comprising, in combination:
   A. a beam (26) bowed in the direction of elongation and having a generally concave side (27) facing the component and a generally convex side (29) facing away from the component;
   B. a first lug (28) provided at a first end of said beam for affixation to the component at a first common attachment point (34);
   C. a second lug (30) provided at a second end of said beam for affixation to the component at a second common attachment point (36); and
   D. a third lug (38) laterally extending from aid beam at a location intermediate said first and second lugs for affixation to the support at a third common attachment point (22);
   E. whereby, under rising temperature conditions, thermal expansion of the component and said beam loads said beam in compression, causing flexure thereof in a direction to produce movement of said third attachment point (22) at said third lug that tracks the movement of aid third attachment point

(22) at the support produced by thermal expansion of the support.

2. The mount defined in claim 1, wherein said first second and third lugs are integrally formed with said beam.

3. The mount defined in claim 2, which is formed of a material having a higher thermal coefficient of expansion than the component.

4. The mount defined in claim 3, wherein said third lug extends laterally from said convex side of said beam.

5. The mount defined in claim 4, wherein said third attachment point is equally spaced from said first and second attachment points.

6. The mount defined in claim 5, wherein a pair of said mounts are affixed to the component and support in opposed relation at opposite sides of the component.

7. A pair of temperature compensating mounts for mounting a transmission operating component to a transmission case, wherein the component and the case have different thermal coefficients of expansion, each said mount comprising, in combination:
  A. a rigid beam permanently bowed in the direction of elongation and having a generally concave side facing the component and a convex side;
  B. a first lug provided at a first end of said beam and affixed to the component at a first common attachment point;
  C. a second lug provided at a second end of said beam and affixed to said component at a second common attachment point; and
  D. a third lug laterally extending from the concave side of said beam and affixed to the case at a third common attachment point;
  E. whereby, with said mounts positioned at opposite sides of the component, thermal expansion of the component and said beams under rising temperature conditions loads said beams in compression, causing flectures of said beams in directions away from the component to produce movements of said third attachment points at said third lugs that track the movements of said third attachment points at the case produced by thermal expansion of the case.

8. The mounts defined in claim 7, wherein said first, second and third lugs are integrally formed with said beam of each said mount.

9. The mounts defined in claim 8, wherein each said mount is formed of a material having a higher thermal coefficient of expansion than the component.

10. The mounts defined in claim 9, wherein said third common attachment points at said third lugs of each said mount are substantially aligned with a horizontal centerline of the component.

11. The mounts defined in claim 10, wherein said first and second attachment points at said first and second lugs, respectively, of each said mount are in substantial vertical alignment.

12. The mounts defined in claim 10, wherein said first and second attachment points are located equidistance above and below the horizontal centerline.

13. The mounts defined in claim 12, wherein said beams are bowed along a curve having a radius of curvature substantially centered at an axis of the component.

* * * * *